United States Patent [19]

Lappinga et al.

[11] Patent Number: 4,975,200

[45] Date of Patent: Dec. 4, 1990

[54] POTASSIUM FLUORIDE REMOVAL FROM POTASSIUM CHLORIDE

[75] Inventors: Alvin J. Lappinga, Martinez; George K. Tyson, Walnut Creek, both of Calif.

[73] Assignee: The Dow Chemical Company, Midland, Mich.

[21] Appl. No.: 461,556

[22] Filed: Jan. 5, 1990

[51] Int. Cl.$^5$ .......................... B01D 9/02; B01D 11/04
[52] U.S. Cl. ..................................... 210/639; 23/296; 23/302 R; 423/499
[58] Field of Search ............... 210/639, 768, 772, 773; 23/296, 302 R, 300; 423/499, 185

[56] References Cited

PUBLICATIONS

Yoshiharu et al., Japanese Application 53 033995, Published Mar. 30, 1978, (Derwent Abstracts, XRAM Acc No. C78-A34220 and Chem. Abs., 89, 26936x (1978).

Kirk-Othmer Encyclopedia of Chemical Technology, Third Edition, 18, pp. 933–935.

*Primary Examiner*—Frank Spear
*Assistant Examiner*—Krisanne Shideler
*Attorney, Agent, or Firm*—D. Wendell Osborne

[57] ABSTRACT

The removal of fluoride ion from potassium chloride containing at least a small amount of an acidic component with water is improved by adjusting the pH of the aqueous solution employed in a fractional crystallization of between about pH6 and about pH9 or adjusting the pH of the extractant used in an aqueous extraction by adding an amount of base so that final pH of the the extract is between about pH6 and about pH9. The fluoride ion contamination of potassium chloride, for example, was reduced from 1000 ppm to 90 ppm by adjusting the aqueous solution employed in a recrystallization of pH6.5 before precipitation.

11 Claims, No Drawings

POTASSIUM FLUORIDE REMOVAL FROM POTASSIUM CHLORIDE

BACKGROUND OF THE INVENTION

The present invention relates to a process for obtaining potassium chloride relatively free of fluoride ion contamination by selective solubility in water having a pH within a narrow range close to neutral.

Potassium chloride as obtained as a by-product of chemical processes and from other sources is often contaminated with small amounts of fluoride ion. This contaminant is deleterious for many applications of potassium chloride and it must be reduced to an acceptable level before use. These mixtures are, further, typically somewhat acidic, having pH values below about 6 when dissolved in water. It is known from Japanese Patent Application JP 53 033995 that some of the potassium fluoride can be removed from potassium chloride solids by extraction with a limited amount of water. Potassium fluoride is, however, not removed as completely as is desirable and considerably more potassium chloride is lost than is desirable using the method as disclosed when the potassium chloride contains some acid contaminants as well as the potassium fluoride. It is further known to separate certain contaminating salts, such as sodium chloride, from potassium chloride by fractional crystallization.

Improved processes for removing fluoride ion from potassium chloride would be of considerable interest.

SUMMARY OF THE INVENTION

It has now been found that the removal of fluoride ion from potassium chloride with water is dependent on the pH of the water employed and can be improved by adjusting the pH of the water to at least about 6.

The invention includes an improved process for removing fluoride ion from potassium chloride containing an acidic component with water by fractional crystallization or by aqueous extraction wherein the improvement comprises adding a base to adjust the pH of the aqueous solution employed in the fractional crystallization to between about pH6 and about pH9 or to adjust the pH of the extractant used in the aqueous extraction so that final pH of the extract is between about pH6 and about pH9.

It is preferred to adjust the pH by adding potassium hydroxide and to adjust the pH to between about pH6.4 and about pH8.

The potassium chloride obtained in the process contains a reduced amount of fluoride ion and is suitable for use in most known applications of this salt.

DETAILED DESCRIPTION OF THE INVENTION

The potassium chloride that is suitable for purification by the process of the present invention can come from any natural or synthetic source. One such source is as a by-product of processes wherein one or more chloro substituents of an organic compound are exchanged to fluoro substituents with potassium fluoride. Examples include the preparation of 2,6-difluoropyridine from 2,6-dichloropyridine, the preparation of 2,6-difluorobenzonitrile from 2,6-dichlorobenzonitrile, and the preparation of fluoroacetic acid from chloroacetic acid. The potassium chloride can be in aqueous solution as well as in solid form. The only requirements are that the potassium chloride contain at least some fluoride ion and at least a small amount of an acidic component and that it not contain substantial amounts of cations other than potassium. The fluoride ion contaminant will typically be greater than about 0.01 percent (100 parts per million (ppm)) and less than about 10 percent. The acidic component will typically be present in sufficient quantities to lower the pH of a saturated aqueous solution of the potassium chloride to below about pH6, usually below about pH5.

Essentially, any water-soluble base can be employed in the process when the pH adjustment requires that only a fraction of a percent of base be added. When a larger amount of base is required, a base having a potassium cation, such as potassium hydroxide, potassium oxide, potassium bicarbonate, or potassium carbonate, is highly preferred. Potassium hydroxide is the base of choice. The base can be employed as a solid or as an aqueous solution.

The fractional crystallization method of purification of potassium chloride (the term "fractional crystallization method" as employed herein is intended to include all purification methods that result in the formation of solid potassium chloride by precipitation from an aqueous medium, including those sometimes termed recrystallization) is generally carried out by preparing or obtaining, in some manner, an aqueous solution of potassium chloride and then causing the potassium chloride to precipitate selectively. For example, a hot, concentrated solution of potassium chloride can be prepared and, subsequently, precipitation caused by allowing the solution to cool. Generally it is advantageous in such methods to employ solutions that are fairly close to saturated in potassium chloride at the elevated temperature, but that contain sufficient water to dissolve essentially all of the fluoride ion as potassium fluoride at the precipitation temperature. To obtain such solutions, water can be added to the potassium chloride or can be removed from the potassium chloride by distillation or evaporation. Precipitation can also be achieved by forming an aqueous solution at a convenient temperature and then removing some of the water by distillation or evaporation until precipitation occurs. Typically, water is removed until the water that remains is fairly close to an amount just sufficient to dissolve essentially all of the fluoride ion (as potassium fluoride) at the temperature employed. In crystallization methods, the precipitate that forms is typically recovered by sedimentation, filtration, or centrifugation and is extracted with a small amount of water or saturated aqueous potassium chloride to remove the entrained aqueous solution containing dissolved fluoride ions.

The known methods of removing fluoride ion from potassium chloride by fractional crystallization are modified according to the present invention by adding sufficient base to the system to raise the pH of the solution obtained before precipitation to between about 6 and about 9. It is preferred to add an amount that will adjust the pH to between about 6.4 and about 8. The addition can be made in any known way, such as by pumping in an aqueous solution of the base or by dropping in solid base. Some mixing is advisable to ensure complete dispersion of the base.

The extraction method of purification of potassium chloride is generally carried out by contacting solid potassium chloride with water or an aqueous solution extractant and subsequently removing the extractant by sedimentation, filtration, or centrifugation. Saturated aqueous potassium chloride is sometimes used and preferred. It is often preferred to carry out the extraction in a continuous manner, adding and removing the extractant simultaneously, usually from the opposite ends of a columnar vessel. Extractant is added until the concentration of fluoride in the effluent is at the desired level or below. The extraction can also be carried out in a batch manner. In batch extractions, an amount of extractant fairly close to an amount just sufficient to dissolve essentially all of the fluoride ion (as potassium fluoride) present at the temperature employed is generally used initially. After this has been removed as much as practical, a small additional amount of extractant is typically added to remove the entrained extractant containing dissolved fluoride ions.

The known methods of removing fluoride ion from potassium by extraction are modified according to the present invention by adding sufficient base to the system to raise the final pH of the extract (the pH of the extract after being used in the process) to between about 6 and about 9. It is preferred to add an amount that will adjust the final pH of the extract to between about 6.4 and about 8. The addition can be made in any known way, such as by pumping in an aqueous solution of the base or by dropping in solid base. Some mixing is advisable to ensure complete dispersion of the base.

The potassium chloride obtained using the improved method of the present invention generally has a reduced fluoride ion contamination of less than about 500 ppm. It is possible, and usually preferable to operate in such a manner as to reduce the fluoride ion contamination to less than about 200 ppm and more preferable to reduce the fluoride ion contamination to less than 100 ppm.

The following example is presented to illustrate the invention. It should not be construed as limiting the claims.

EXAMPLE

Example 1

Efficiency of Removal of Fluoride by Crystallization

Two identical saturated aqueous solutions of potassium chloride, each containing 1000 ppm of fluoride ion (based on potassium chloride) as potassium hydrogen fluoride, were prepared. The pH was measured and found to be 3.5. Sufficient potassium hydroxide (as a 50 percent aqueous solution) was added to one of the solutions to raise the pH to 6.5: the other solution was not basified and was treated as a control. The solutions were both heated to boiling to remove water by distillation and/or evaporation until crystals began to form. They were then allowed to cool slowly to about 25° C. The crystals that formed were separately recovered by filtration, extracted with first a small amount of saturated aqueous potassium chloride and then with acetone, dried in an oven under reduced pressure, and analyzed for fluoride ion by fluoride selective electrode analysis. The potassium chloride recovered from the solution treated according to the present invention (crystallization at pH6.5) was found to contain 90 ppm of fluoride ion. That recovered from the control solution was found to contain 760 ppm of fluoride ion.

What is claimed is:

1. An improved process for removing fluoride ion from potassium chloride containing an acidic component with water by fractional crystallization or by aqueous extraction wherein the improvement comprises adding a base to adjust the pH of the aqueous solution employed in the fractional crystallization to between about pH6 and about pH9 or to adjust the pH of the extractant used in the aqueous extraction so that final pH of the extract is between about pH6 and about pH9.

2. A process according to claim 1 wherein fractional crystallization is employed.

3. A process according to claim 2 wherein the pH is adjusted to between about 6.4 and about 8.

4. A process according to claim 2 wherein the pH is adjusted with a base having a potassium cation.

5. A process according to claim 4 wherein the base is potassium hydroxide.

6. A process according to claim 2 wherein the fluoride ion is reduced to about 500 ppm or less.

7. A process according to claim 1 wherein aqueous extraction is employed.

8. A process according to claim 7 wherein the pH is adjusted to between about 6.4 and about 8.

9. A process according to claim 7 wherein the pH is adjusted with a base having a potassium cation.

10. A process according to claim 9 wherein the base is potassium hydroxide.

11. A process according to claim 1 wherein the fluoride ion is reduced to about 500 ppm or less.

* * * * *